(12) United States Patent
Green et al.

(10) Patent No.: US 9,599,258 B1
(45) Date of Patent: Mar. 21, 2017

(54) MECHANICAL PIPE JOINTS AND METHODS OF FORMING AND SEALING THE SAME

(71) Applicants: Herbert J. Green, Kingwood, TX (US); Major G. Butler, Kingwood, TX (US)

(72) Inventors: Herbert J. Green, Kingwood, TX (US); Major G. Butler, Kingwood, TX (US)

(73) Assignee: BUTLER TECH CORPORATION, Kingwood, TX (US)

( * ) Notice: Subject to any disclaimer, the term of this patent is extended or adjusted under 35 U.S.C. 154(b) by 194 days.

(21) Appl. No.: 14/519,118

(22) Filed: Oct. 20, 2014

Related U.S. Application Data

(60) Provisional application No. 61/893,847, filed on Oct. 21, 2013.

(51) Int. Cl.
*F16L 13/11* (2006.01)
*F16L 25/10* (2006.01)

(52) U.S. Cl.
CPC ............ *F16L 13/116* (2013.01); *F16L 25/10* (2013.01)

(58) Field of Classification Search
CPC ................................ F16L 13/116; F16L 25/10
See application file for complete search history.

(56) References Cited

U.S. PATENT DOCUMENTS

| | | |
|---|---|---|
| 3,567,257 A | 3/1971 | Nowosadko |
| 3,606,403 A | 9/1971 | Medney |
| 3,784,235 A | 1/1974 | Kessler et al. |
| 3,909,045 A | 9/1975 | Meagher |
| 3,937,641 A | 2/1976 | Kushner et al. |
| 4,076,167 A | 2/1978 | Wright |
| 4,095,825 A | 6/1978 | Butler |
| 4,120,083 A | 10/1978 | Echols |
| 4,505,017 A | 3/1985 | Schukei |
| 4,506,919 A | 3/1985 | Peting |
| 4,541,655 A | 9/1985 | Hunter |
| 4,696,499 A | 9/1987 | Butler |
| 4,769,897 A | 9/1988 | Moseman |
| 5,090,837 A | 2/1992 | Mower |
| 5,274,897 A | 1/1994 | Mieszelewicz et al. |
| 5,398,980 A | 3/1995 | Hunter et al. |
| 5,398,981 A | 3/1995 | Barton |
| 5,511,831 A | 4/1996 | Barton |
| 5,794,982 A | 8/1998 | Green et al. |

(Continued)

*Primary Examiner* — Rodney Mintz
(74) *Attorney, Agent, or Firm* — Kenneth A. Roddy

(57) ABSTRACT

Mechanical pipe joints formed between first and second sections of metal pipe or tubing. A pin section on the end of the first pipe section has a cylindrical pin section and a formed pin section that provides the bottom contour of a tapered annular cavity and is coated with sealant. A socket on the end of the second pipe section has a cylindrical socket section and a tapered socket section that forms the remaining contour of the tapered annular cavity. The pin is hydraulically forced into the socket until the end of the formed pin section engages the tapered socket section. The cylindrical socket section of the socket has an inside diameter less than the outside diameter of the cylindrical pin section to form an interference fit that provides the strength of the joint. Sealant is extruded longitudinally and trapped in the tapered annular cavity to prevent leaking.

8 Claims, 4 Drawing Sheets

(56) References Cited

U.S. PATENT DOCUMENTS

| | | | |
|---|---|---|---|
| 7,918,006 B2* | 4/2011 | Brayman | B23P 11/025 |
| | | | 285/332 |
| 2006/0022465 A1 | 2/2006 | Yamauchi | |
| 2008/0143101 A1 | 6/2008 | Logan | |
| 2008/0231042 A1* | 9/2008 | Brayman | B23P 11/025 |
| | | | 285/41 |

\* cited by examiner

MECHANICAL PIPE JOINTS AND METHODS OF FORMING AND SEALING THE SAME

CROSS REFERENCE TO RELATED APPLICATION

This application claims priority of U.S. Provisional Application Ser. No. 61/893,847, filed Oct. 21, 2013.

BACKGROUND OF THE INVENTION

1. Field of the Invention

This invention relates generally to mechanical pipe joints, and, more particularly to mechanical pipe joints formed between sections of metal pipe or tubing by forcing a pin section on the end of one pipe section into a socket formed on the end of another pipe section and to methods for sealing these joints to improve the performance and reliability of mechanical pipe joints under the most severe field conditions.

2. Background Art

In many applications, mechanical pipe joints have advantages over other conventional types of pipe joints. They require no welder in the field and therefore a pipeline can be laid using this type of joint with relatively inexpensive, unskilled workers. Also, no alignment clamps are required, as in the case of welded joints. Using this type of pipe joint, instead of a threaded pipe joint, eliminates the problem of thread protection while moving the pipe to the field and stringing it along the right of way. In most circumstances and conditions, a mechanical pipe joint can be completed many times faster than a threaded or welded joint. Such a joint is particularly advantageous for use with internally coated pipe because forming the joint will not damage the coating and any gap between the coatings on the two joined pipe ends is filled with a sealant which is used to seal the joint.

Mechanical joints are formed by forcing a pin section on the end of one pipe section into a socket formed on the end of another pipe section. The socket includes a cylindrical section, which has an inside diameter slightly less than the diameter of the pin, to form an interference fit between the pin and cylindrical section of the socket when the joint is assembled. The interference fit provides structural strength to the joint.

The socket also includes a conical or tapered section between the cylindrical section and the pin section. The socket is formed by inserting a mandrel of a predetermined size into the pipe to bell the end of the pipe outwardly to form both the cylindrical section and the tapered section. The pin section of the joint requires only the forming of a tapered section on the end of the pipe.

Butler, U.S. Pat. No. 4,095,825, commonly owned with the present application, and which is hereby incorporated by reference herein in its entirety, discloses a tapered pipe joint wherein the tapered section of the socket and the tapered section of the pin are provided with diverging taper angles which result in an open-ended annular cavity being formed between the tapered sections when the pin was fully inserted into the socket. Sealant is trapped in the annular cavity between the diverging tapers and the socket and pin to form a seal in the cavity. Although this mechanical pipe joint is effective, the open-ended annular cavity formed by the diverging tapered angles creates a weakness in the seal of the joint that increases the probability of leakage over time and is ineffective in providing a "holiday" free pipe surface for internally coated pipe. A "holiday" is a defect, discontinuity, or thin spot in a coating.

Butler, U.S. Pat. No. 4,696,499, commonly owned with the present application, and which is hereby incorporated by reference herein in its entirety, discloses a mechanical pipe joint and method of forming the same, which was an improved mechanical pipe joint wherein the tapered sections on the socket and the pin, respectively, have converging taper angles that form a substantially closed annular cavity in which sealant is trapped to provide a seal for the joint. Additionally, this patent provides a seal and a coating technique that protects mechanical pipe joints in an internally coated pipeline from erosion by the corrosive fluids flowing through the pipeline. This patent improves the sealing area by the application of converging taper angles that create a substantially closed annular cavity in which sealant is trapped to provide a seal for the joint. It also provides a workable method for utilizing mechanical pipe joints with internally coated pipe. The mechanical joint configuration of this patent, however, has several disadvantages that become apparent in the most demanding and severe field applications. First, the seal is created by the contact of two pipe sections with converging angles. Accordingly, the thickness of the seal is limited to the thickness of the portion of the end of the taper section of the pin which actually comes in contact with the taper section of the socket. This thickness is many times less than the width of the pin and may result in a penetration into the wall of the socket. Second, the surface configurations of the sections of the pin and socket that create the annular cavity fail to take advantage of the exothermic properties of the latest acrylated synthetic polymers used as sealants under severe cold weather conditions. Third, the bottom section of the tapered end of the pin extends downwardly past the inside surface of the pipe creating a small obstruction that can create turbulence in the area of the mechanical pipe joint as fluids move through the pipeline.

Various other systems and methods have been devised to join the ends of pipes, most of which have the problems and disadvantages mentioned above. For example, Meagher, U.S. Pat. No. 3,909,045, discloses a plastic pipe joint configuration for use with adhesives that includes a female member having a retaining area and a male member having a piston means for applying pressure to the adhesive during telescoping of the members to hydraulically force the adhesive into the retaining area to eliminate voids and provide a leak-tight joint. The female member is provided with axially spaced flanges at each end of the retaining area that are adapted to be engaged when the members are fully telescoped by a mating surface on the free end of the male member and by the piston means to seal the void-free adhesive in the retaining area. Joining plastic pipe using adhesives, however, is generally unacceptable due to the difficult adherence characteristics of many polymers, which can result (after a period of time) in cracks in the cured adhesive or in separation of the adhesive from the pipe surface. The use of adhesive or glue also often involves a change in the inner diameter or outer diameter of one or both of the plastic pipes, such as with a bell-and-pipe slip joint. Non-uniform pipe diameters can introduce difficulties when installing the pipe.

SUMMARY OF THE INVENTION

The present invention overcomes the aforementioned problems and is distinguished over the prior art in general, and these patents in particular, by mechanical pipe joints formed between sections of metal pipe or tubing by forcing a pin section on the end of one pipe section into a socket formed on the end of another pipe section and to methods for sealing these joints. The end of a second pipe section is preformed into a socket containing in part a tapered socket section. The pin on the end of a first pipe section contains a formed pin section and cylindrical pin section. The formed pin section is coated with sealant. The pin is then hydraulically forced into the socket until the end of formed pin section engages the tapered socket section. The cylindrical socket section of the socket has an inside diameter less than the outside diameter of cylindrical pin section to form an interference fit that provides the strength of the joint. Sealant is extruded longitudinally and is trapped in the tapered annular cavity which provides a seal to prevent leaking. Preferably, synthetic polymer sealants including highly reactive acrylated polymeric adhesives which become elastomeric even under conditions of extreme cold are utilized. In a preferred embodiment, the contact taper segment of formed pin section, and tapered socket section have equal angles of taper to insure that contacting surfaces will be flush and there will be no penetration of the formed pin section into the wall of tapered socket section and the width of the seal created by this contact will be the maximum obtainable. All of the formed pin section is positioned on or above a line extending along the inside wall of the second pipe section and through the inside of the joint, thereby assuring no turbulence generating restrictions are present on the inside wall surface. Other embodiments of the formed pin section form a triangular annular cavity, quadrilateral annular cavity, and compressed annular cavity. These cavities contain large masses of sealant to achieve increased heat, thereby reducing the time required for the sealant to achieve an elastomeric state in extreme cold environments.

One of the significant features and advantages of the present invention is that it provides a thicker more uniform mechanical joint seal that eliminates the potential for wall penetration and can be created with a higher degree of consistency and reliability.

Another feature and advantage of the present invention is that it provides wall surface profiles for the sections of the pin and socket that form the annular sealant cavity to improve the functionality of the sealant under severe cold weather field conditions.

Another feature and advantage of the present invention is that it eliminates the obstruction and resulting turbulence caused by the penetration of the bottom of the tapered section of the pin below the inside walls of the joined pipe sections.

Another feature and advantage of the present invention is that it significantly improves the joint seal surrounding joined sections of internally coated pipe, further reducing the likelihood of penetration by corrosive fluids through the area of the seal.

A further feature and advantage of the present invention is that it broadens the scope of mechanical pipe joint utilization by providing improved mechanical joint embodiments that eliminate current restrictive features and take advantage of the properties of advanced sealants.

A still further feature and advantage of the present invention is that it significantly reduces the potential for leakage in mechanical joint systems, thus improving the overall reliability and cost effectiveness of mechanical joint installations when measured against competing methodologies of joining pipe.

Other features and advantages of the invention will become apparent from time to time throughout the specification and claims as hereinafter related.

DESCRIPTION OF THE PREFERRED EMBODIMENTS

Figure 1:
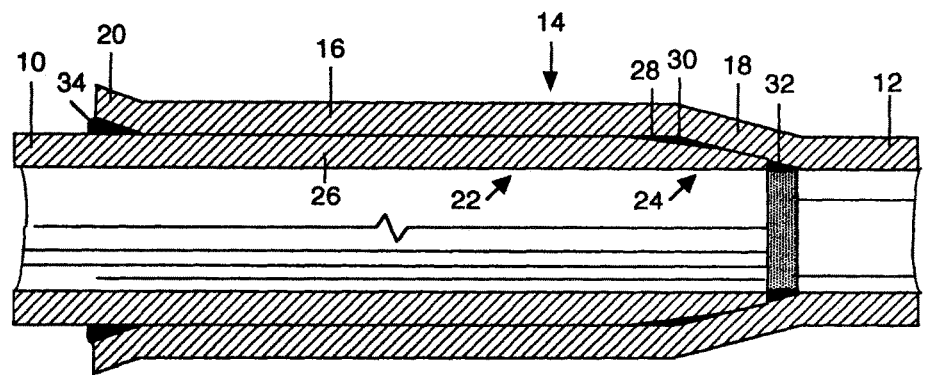
FIG. 1 is a longitudinal cross sectional view showing a preferred embodiment of the mechanical pipe joint of the present invention.

Referring to the drawings by numerals of reference, there is shown in FIG. 1, a mechanical pipe joint wherein a first pipe section 10 is connected to a second pipe section 12 in accordance with a preferred embodiment of the present invention. The pipe sections have the same nominal outside diameter and wall thickness. The end of second pipe section 12 is preformed into a socket 14, comprising a cylindrical socket section 16, a tapered socket section 18, and a flare socket section 20. Tapered socket section 18 of socket 14 connects socket 14 to the remainder of the second pipe section 12. A pin 22 on the end of first pipe section 10 contains a formed pin section 24 and a cylindrical pin section 26. Formed pin section 24 of pin 22 provides the bottom contour of a tapered annular cavity 28. A portion of the cylindrical socket section 16 and tapered socket section 18 form the remaining contour of tapered annular cavity 28. A sealant 30, applied to formed pin section 24 prior to insertion, is trapped in tapered annular cavity 28 as described in the operations section below. An internal annular bead 32 and an external annular bead 34, represent quantities of sealant 30 pressed out of the joint connection during insertion of pin 22.

Figure 2:
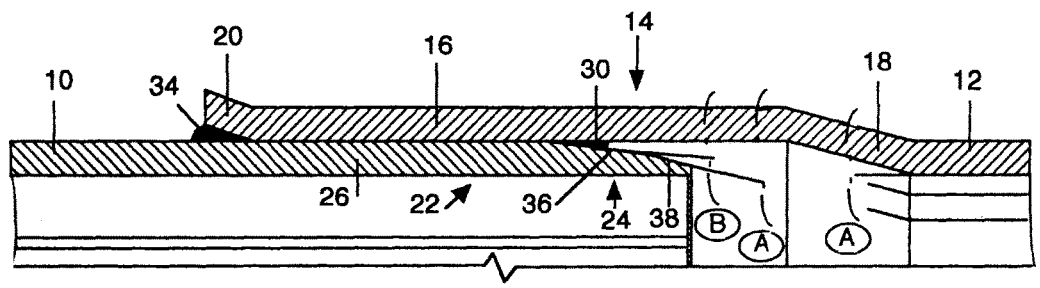
FIG. 2 is a longitudinal cross sectional view of the upper half of the socket and pin sections of the mechanical pipe joint of FIG. 1, shown with the pin partly inserted into the socket.

FIG. 2 shows the pin 22 partially inserted into the socket 14, and shows a cavity segment 36 and a contact taper segment 38 of the formed pin section 24. In this embodiment of formed pin section 24, contact taper segment 38 and tapered socket section 18 of socket 14 have equal angles of taper, both identified by a circled "A". The angle of taper of cavity segment 36, identified by a circled "B", is less than the angle of taper of the contact taper segment 38 and tapered socket section 18.

Figure 3:
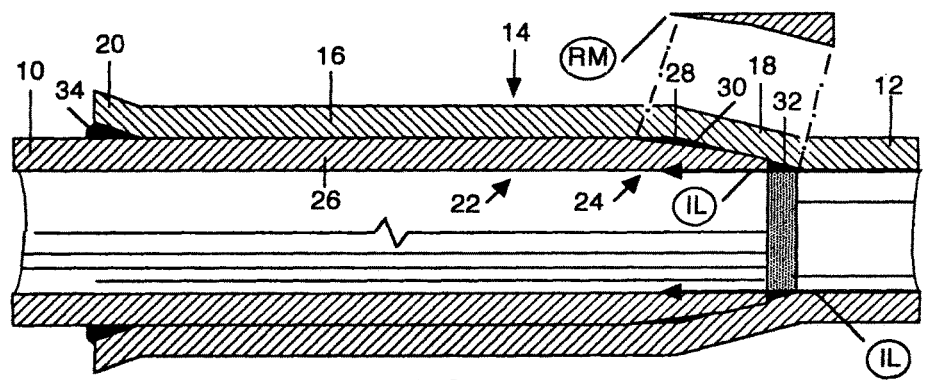
FIG. 3 is a longitudinal cross sectional view of the view of the mechanical pipe joint of FIG. 1, a section the alignment between the pipe walls in an exploded view.

Referring additionally to FIG. 3, the positional relationship between formed pin section 24 of pin 22 and the inside wall of second pipe section 12 is shown. All of formed pin section 24, including the extreme inside or bottom portion, is positioned on or above an imaginary straight line, identified by a circled "IL", extending along the inside wall of the second pipe section 12 and through the inside of the mechanical pipe joint. This alignment of pin 22 is workable due to the pin configuration of this embodiment. The outside surface of the end of pin 22 is contoured in a machining operation conducted prior to the insertion of pin 22 into socket 14. As shown in the exploded section the previously removed surface metal is represented by a circled "RM".

Figure 4:
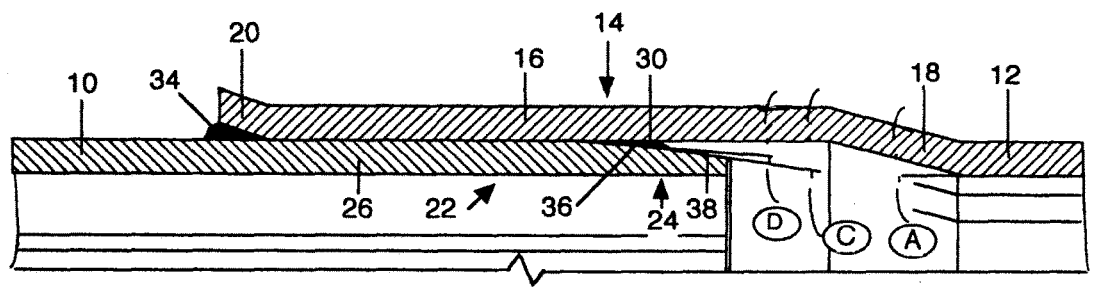
FIG. 4 is a longitudinal cross sectional view of the upper half of the socket and pin sections similar to FIG. 2, showing of an alternate embodiment of the taper angles on the formed end of the pin.

FIG. 4 shows a second embodiment of the taper angles on the pin section 24 formed on the pin 22 is shown. Contact taper segment 38 has an angle of taper, identified by a circled "C", which is less than the angle of taper of the tapered socket section 18, identified by a circled "A". Cavity segment 36 has an angle of taper, identified by a circled "D", which is less than the angle of taper of the contact taper segment 38.

Figure 5:
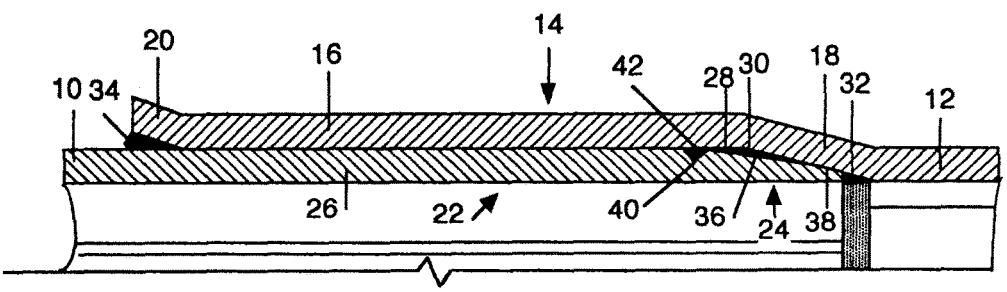
FIG. 5 is a longitudinal cross sectional view of the upper half of the socket and pin sections of an alternate embodiment of the formed end of the pin, profiled to achieve an extended width annular cavity in the mechanical pipe joint.

FIG. 5 shows a modification of the second embodiment of the taper angles on the pin section 24 of pin 22, wherein a tapered annular cavity 28 is formed between a portion of tapered socket section 18, a portion of cylindrical socket section 16, and cavity segment 36. In this modification, the cavity segment 36 is configured with a taper. Formed in this manner, the tapered annular cavity 28 is very narrow, coming to a point at the end of cavity segment 36 with its widest section located between cavity segment 36 and the apex of tapered socket section 18. A triangular annular cavity 42 is formed between cylindrical socket section 16 of socket 14 and a triangular cavity segment 40 which is profiled on the outside wall surface of pin 22. Triangular annular cavity 42 is connected to tapered annular cavity 28, forming in combination an extended width annular cavity containing in part an annular section with a concentrated area of capacity.

Figure 6:
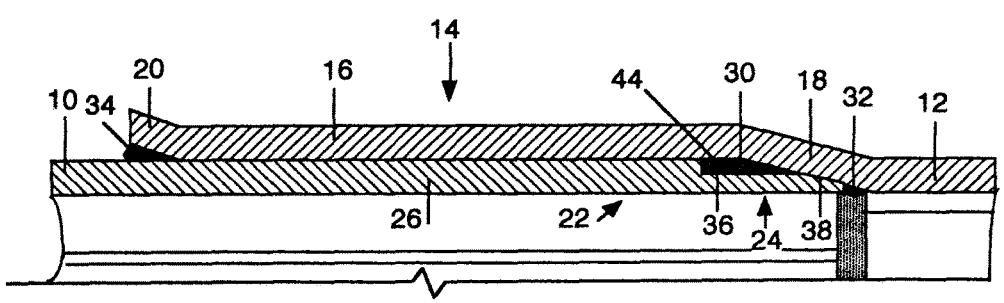
FIG. 6 is a longitudinal cross sectional view of the upper half of the socket and pin sections of an alternate embodiment of the formed end of the pin, profiled to achieve a quadrilateral annular cavity in the mechanical pipe joint.

FIG. 6 shows another alternate embodiment of formed pin section 24 of the pin 22 having a quadrilateral annular cavity 44. The quadrilateral annular cavity 44 is, as the name implies, a four sided cavity. This cavity is made up of a first side, formed by a surface of cavity segment 36 of formed pin section 24 which is perpendicular to the outside wall surface of pin 22, a second side, formed by a surface of cavity segment 36, recessed from and parallel to the outside wall surface of pin 22, a third side, formed by a portion of cylindrical socket section 16 of socket 14, and a fourth side, formed by a portion of tapered socket section 18 of socket 14.

Figure 7:
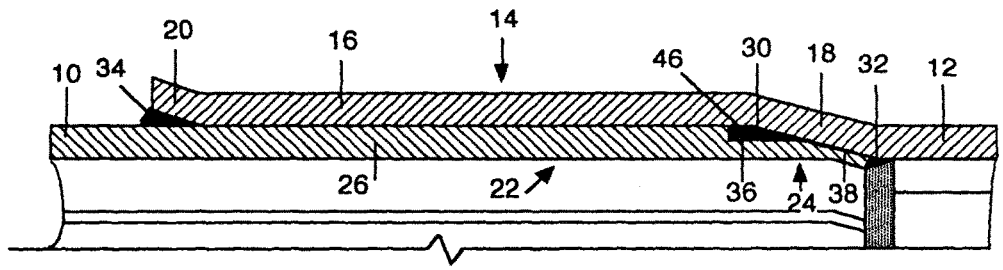
FIG. 7 is a longitudinal cross sectional view of the upper half of the socket and pin sections of an alternate embodiment of the quadrilateral annular cavity achieved by adjusting insertion depth to form a compressed annular cavity.

FIG. 7 shows another alternate embodiment of formed pin section 24 of the pin 22 wherein the quadrilateral annular cavity is modified to form a compressed annular cavity 46. In this embodiment, the quadrilateral annular cavity 44 shown in FIG. 6 and described above, is compressed to a reduced size by the insertion of pin 22 into socket 14 beyond the initial contact point of contact taper segment 38 of formed pin section 24 of pin 22 with tapered socket section 18 of socket 14.

Figure 8:
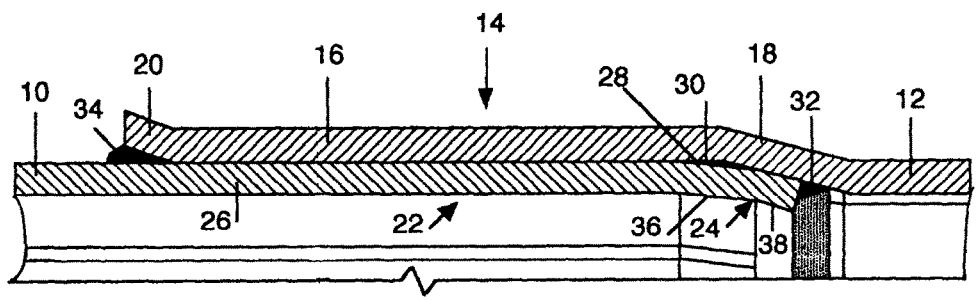
FIG. 8 is a longitudinal cross sectional view of the upper half of the socket and pin sections of a mechanical pipe joint having an alternate embodiment of the pin section.

FIG. 8 shows an alternate embodiment of the formed pin 22 is shown wherein contact taper segment 38 and cavity segment 36 of the formed pin section 24 are profiled on the outside and inside of the pin 22 by bending operation. All other attributes of the joint remain unchanged except the positional relationship between formed pin section 24 and the inside wall of second pipe section 12. In this instance the extreme bottom edge of formed pin section 24 is positioned slightly inside the horizontal plane of the inside wall of second pipe section 12.

Figure 9:
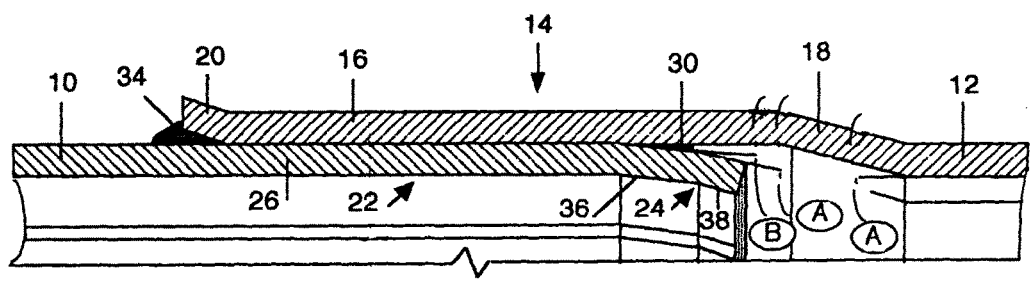
FIG. 9 is a longitudinal cross sectional view of the upper half of the socket and pin sections of the mechanical pipe joint of FIG. 8, showing the pin partially inserted into the socket.

FIG. 9 shows a modification of the mechanical pipe joint of FIG. 8, showing the pin 22 partially inserted into the socket 14. In this modification, the contact taper segment 38 of formed pin section 24 and tapered socket section 18 of socket 14 have equal angles of taper, identified by a circled "A". The angle of taper of cavity segment 36, identified by a circled "B", is less than the angle of contact taper segment 38 and tapered socket section 18.

Figure 10:
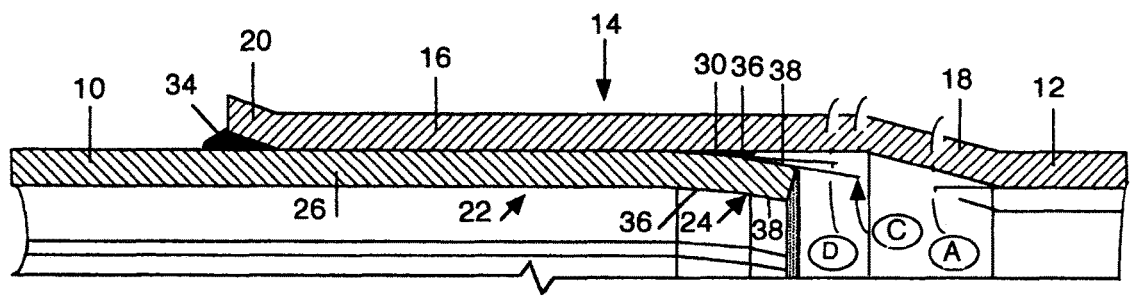
FIG. 10 is a longitudinal cross sectional view of the upper half of the socket and pin sections of the mechanical pipe joint of FIG. 8, showing the pin partially inserted into the socket with an alternate configuration of taper angles on the formed end of the pin.

FIG. 10 shows a further modification of formed pin section 24 of the alternative embodiment of the pin 22. Contact taper segment 38 of formed pin section 24 has an angle of taper, identified by a circled "C", less than the angle of taper of tapered socket section 18, identified by a circled "A". Cavity segment 36 of formed pin section 24, identified by a circled "D", has an angle of taper less than the angle of taper of the contact taper segment 38.

Figure 11:
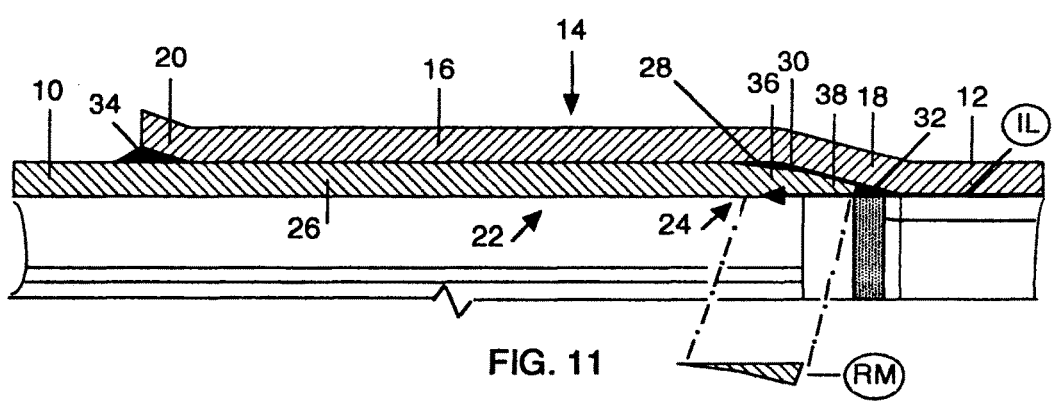
FIG. 11 is a longitudinal cross sectional view of the upper half of the socket and pin sections of the mechanical pipe joint of FIG. 8, showing the pin partially inserted into the socket with an alternate configuration of taper angles on the formed end of the pin to eliminate the potential of flow obstructions.

FIG. 11 shows an additional modification of formed pin section 24 of the alternate embodiment of the pin 22 shown in FIG. 8, and described above, wherein the contact taper segment 36 and cavity segment 38 of formed pin section 24 are profiled on outside and inside wall surfaces of the pin 22 in a bending operation. As noted in the description of FIG. 8, the extreme bottom edge of formed pin section 24 is positioned slightly inside the horizontal plane of the inside wall of second pipe section 12. In this modification, the inside wall surface of pin 22, previously profiled by a bending operation, is subsequently shaped by a machining operation, conducted prior to the insertion of pin 22 into socket 14, to a contour which is substantially parallel to the inside wall surface of first pipe section 10 and second pipe section 12. The positional relationship between the remaining portion of formed pin section 24 and the inside wall of second pipe section 12 is shown in FIG. 11. All of the remaining portion of formed pin section 24, including the extreme inside or bottom area, is positioned on or above an imaginary straight line, identified by a circled "IL", extending along the inside wall of second pipe section 12 and through the inside of the mechanical pipe joint. The alignment of pin 22 in made possible by the configuration of pin 22 as described above. As shown in the exploded section, the surface metal which was previously removed from the inside surface of formed pin section 24 of pin 22 is represented by a circled "RM".

Figure 12:
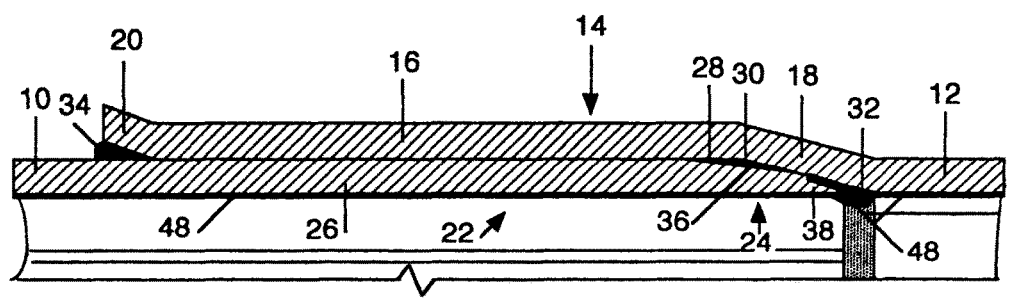
FIG. 12 is a longitudinal cross sectional view of the upper half of the socket and pin sections of the mechanical pipe joints of FIG. 1 or FIG. 11, as it is used with internally coated pipe.

FIG. 12 shows the mechanical pipe joint of FIG. 1 or FIG. 11 containing the preferred or alternate embodiment of pin 22, wherein an internal coating 48 is applied to the inside walls of first pipe section 10, second pipe section 12, and certain mechanical joint components and surfaces. The inside wall of tapered socket section 18 of socket 14 is coated with internal coating 48 from the end of the inside wall of tapered socket section 18 connecting with the inside wall of second pipe section 12, to a point beyond which contact taper segment 38 of formed pin section 24 of pin 22 intersects with tapered socket section 18 during insertion of pin 22. The inside wall of pin 22 of first pipe section 10 is coated, with internal coating to the end of formed pin section 24, around the end of formed pin section 24 covering the flat surfaced tip of formed pin section 24, and around the flat surfaced tip covering a portion of the outside wall of formed pin section 24 of pin 22.

OPERATION

The manner of joining together the first pipe section 10 and second pipe section 12 to form the mechanical pipe joints of FIG. 1 through FIG. 12 is the same. This operation is described referencing FIG. 1. Socket 14 of second pipe section 12 is formed by a hydraulic forming operation prior to the creation of the mechanical pipe joint. Pin 22 of first pipe section 10 is also formed prior to the creation of the mechanical pipe joint in either a machining operation or bending operation. Immediately prior to insertion, the formed pin section 24 of pin 22 is coated with sealant 30 and then positioned on the inside lip of socket 14, resting on the inside edge of flared socket section 20. The flared socket section 20 is formed to facilitate the stabbing of pin 22 into the socket 14 and provides a surface area for the positioning of pin 22 on the inside lip of socket 14 prior to insertion. Pin 22 is then forced into socket 14 until the end of the formed pin section 24 engages the inside surface of the tapered socket section 18 of socket 14. A hydraulic means (not shown) is utilized to perform the insertion.

Cylindrical socket section 16 of socket 14 has an inside diameter slightly less than the outside diameter of cylindrical pin section 26 of first pipe section 10, approximately 0.75 to 1.2 millimeters. Accordingly, when pin 22, on the end of first pipe section 10 is inserted into socket 14, there will be an interference fit between the outside surface of cylindrical pin section 26 and the inside surface of cylindrical socket section 16. The interference fit between cylindrical section 16 and cylindrical pin section 26 provides the mechanical strength of the joint, that is, its ability to withstand tensile and bending forces.

Sealant 30 is extruded longitudinally from between the tapered sections, as the cylindrical pin section 26 moves into engagement with the tapered socket section 18. A generous supply of sealant 30 should be applied to formed pin section 24 to assure that the tapered annular cavity 28 is filled with sealant 30 when the pin 22 is fully inserted. The majority of excess sealant 30 will flow over the end of the formed pin section 24. This excess sealant forms an internal annular bead 32 of sealant 30. The internal annular bead 32 is exposed to the fluid flowing in the pipe, whereas, sealant 30 in the tapered annular cavity 28 is not, and will remain in place indefinitely. The sealant 30 trapped in the tapered annular cavity 28 provides a seal between the two surfaces and prevents fluid from leaking through the mechanical joint. A small portion of sealant 30, trapped between the flared socket section 20 and the outside exposed wall of the cylindrical pin section 26, forms external annular bead 34.

Many alternative substances that are soft enough to apply to formed pin section 24 and which will fill the cavity and later harden can serve as a sealant. Preferably, synthetic polymers including highly reactive acrylated polymeric adhesives are utilized. These substances are semi-solid before application and later become elastomeric even when exposed to extreme variations in ambient temperatures.

The manner of forming the mechanical pipe joint embodiments of our invention are described below. FIG. 1 through FIG. 3 show the mechanical pipe joint with the preferred embodiment of pin 22 and formed pin section 24. FIG. 4 through FIG. 7 show the preferred embodiment of pin 22 but with alternative embodiments of formed pin end 24. FIG. 8 through FIG. 11 show an alternative embodiment of pin 22 with both preferred and alternative embodiments of formed pin end 24. FIG. 12 shows the mechanical pipe joint of FIG. 1, or alternatively FIG. 11, with the application of internal coating 48.

The preferred embodiment of pin 22 and formed pin section 24 is displayed in FIG. 1 and FIG. 3. In this instance, the outside surface of the end of pin 22 is contoured in a operation conducted prior to the insertion of pin 22 into socket 14 utilizing a machining means. The section of metal removed by this machining means is identified with a circled "RM" on FIG. 3. As noted on FIG. 2 the angle of taper of cavity segment 36, identified by a circled "W", is less than the angle of taper of tapered socket section 18, Identified by a circled "A". This lesser angle of taper insures that contact taper segment 38 will come in contact with the inside wall of tapered socket section 18 to create tapered annular cavity 28 shown in FIG. 3. Because the angle of taper of contact taper segment 38 and tapered socket section 18 are identical, as noted by the circled "A' on FIG. 2, the contacting surfaces will be flush, there will be no penetration of formed pin section 24 into the wall of tapered socket section 18 and the width of the closure and the sealing effect created by this contact will be the maximum obtainable.

As shown in FIG. 3, the formed pin section 24 of pin 22 is configured such that following the joining of the two pipe sections, no surface area of pin 22 is positioned below the inside wall of the second pipe section 12, thereby assuring no turbulence generating restrictions are created on the inside wall surface of the mechanical joint. The position consistent with the inside wall surface of second pipe section 12 is identified by the imaginary straight line, labeled with a circled "IL" in FIG. 3.

As discussed above, FIG. 4 through FIG. 7 show the preferred embodiment of pin 22 but with alternative embodiments of the formed pin end 24. In the embodiment of formed pin section 24 shown in FIG. 4, the angles of taper of the contact taper segment 38, identified by a circled "C", and cavity segment 36, identified by a circled "D", are both less than the angle of taper of the tapered socket section 18, identified by a circled "A". In comparison to the mechanical joint of FIG. 3, this configuration will result in an earlier contact between the contact taper segment 38 and the inside wall of the tapered socket section 18. It provides the advantage of a slightly longer tapered annular cavity 28, however the seal created at the contact point of the contact taper segment 38 with the tapered socket section 18 will be reduced in width and thickness.

In the embodiment of FIG. 5, an additional modification of the formed pin section 24 is shown wherein a triangular cavity segment 40 is profiled on the outside wall surface of pin 22 in a machining operation conducted prior to the insertion of pin 22 into the socket 14. The addition of the triangular cavity segment 40 to formed pin section 24 results in a significant change in the configuration of the annular cavity formed as the two pipe ends are joined. This concentrated area of capacity, namely, triangular annular cavity 42, contains, following insertion of pin 22, a concentrated mass of sealant 30. Due to the exothermic properties of highly reactive acrylated polymeric adhesives used to formulate sealant 30 for cold weather applications, this concentrated mass of sealant 30 will generate increased heat, thus reducing the time required for sealant 30 to achieve a elastomeric state under extreme cold conditions.

In the embodiment of FIG. 6, the formed pin section 24 is configured by the removal of a rectangular dimensioned section from the outside surface end of pin 22 by a machining operation conducted prior to the insertion of pin 22 into the socket 14 whereby a quadrilateral annular cavity 44 is formed as the two pipe ends are joined which has the capacity to contain an even greater high concentrated mass of sealant 30. As noted in the description of FIG. 5 above, this concentrated mass of sealant 30, will, due the exothermic properties of the sealant 30 used for cold weather applications, reduce the time required for sealant 30 to achieve a elastomeric state under extreme cold conditions.

As shown in FIG. 7, a compressed annular cavity 46 is formed when the quadrilateral annular cavity 44 is compressed to a reduced size. This is accomplished by the insertion of pin 22 into socket 14 beyond the initial contact point of contact between the contact taper segment 38 of formed pin section 24 with the tapered socket section 18 of socket 14, thereby assuring sealant 30, already trapped in the cavity, completely fills compressed annular cavity 46 and forms a continuous and consistently sized annular mass around the joint, thus increasing the level of reliability of the seal. This additional movement of pin 22 into socket 14 is very slight. Usually, the machinery operator will place a mark on pin 22 a known distance from the end of the pin to identify the point of engagement of the contact taper section 38 with the tapered socket section 18. To achieve compression of the now formed cavity, the operator may apply more force to slightly decrease the volume of the cavity, thereby obtaining the advantage described above.

In the alternate embodiment of pin 22 shown in FIG. 8 through FIG. 10, the contact taper segment 38 and cavity segment 36 of the formed pin section 24 are profiled on the outside and inside wall surface of the pin 22 by a bending operation as an alternative to the machining operation utilized in the joints of FIG. 1 through FIG. 7. As a result of this forming method, the extreme bottom edge of the formed pin section 24 is positioned slightly inside the horizontal plane of the inside wall of the second pipe section 12. Although this embodiment of the pin 22 provides a slight manufacturing cost advantage over the embodiments of FIG. 1 through FIG. 7, it restricts the capability to position all of pin 22 on or above the horizontal plane of the inside wall of the second pipe section 12.

As discussed above, FIG. 9 shows an alternate embodiment of the pin section 24 of the alternate of pin 22 of the mechanical pipe joint of FIG. 8. In this embodiment the angle of taper of cavity segment 36, identified by a circled "B", is less than the angle of taper of tapered socket section 18, identified by a circled "A". This lesser angle of taper insures that the contact taper segment 38 will come in contact with the inside wall of the tapered socket section 18 to create the tapered annular cavity 28 shown in FIG. 8. Because the angle of taper of the contact taper segment 38 and the tapered socket section 18 are identical, noted by the circled "A" in FIG. 9, the contacting surfaces will be flush, there will be no penetration of the formed pin section 24 into the wall of the tapered socket section 18, and the width of the closure and the sealing effect created by this contact will be the maximum obtainable. The taper angles are the same as shown in FIG. 2 for the preferred embodiment of pin 22 and formed pin section 24.

In the alternate embodiment of the formed pin 22 shown in FIG. 10, the angles of taper of the contact taper segment 38, identified by a circled "C", and the cavity segment 36, identified by a circled "D", are both less than the angle of taper of the tapered socket section 18, identified by a circled "A". In comparison to the mechanical joint of FIG. 9, this configuration will result in an earlier contact between the contact taper segment 38 and the inside wall of the tapered socket section 18. It provides the advantage of a slightly longer tapered annular cavity 28 than is shown in FIG. 8, however the seal created at the contact point of the contact taper segment 38 with the tapered socket section 18 will be reduced in width and thickness. The taper angles are the same as the alternate embodiment of formed pin section 24 shown in FIG. 4.

As discussed above, FIG. 11 shows an additional modification of formed pin section 24 of the alternate embodiment of the pin 22 shown in FIG. 8, wherein the contact taper segment 38 and cavity segment 38 of the formed pin section 24 are profiled on outside and inside wall surfaces of the pin 22 in a bending operation and is subsequently shaped by a machining operation to a contour which is substantially parallel to the inside wall surface of first pipe section 10 and second pipe section 12. This is accomplished prior to the insertion of pin 22 into the socket 14. The formed pin section 24 of pin 22 is configured such that following the joining of the two pipe sections, no surface area of pin 22 is positioned below the inside wall of the second pipe section 12, thereby assuring no turbulence generating restrictions are created on the inside wall surface of the mechanical joint. The position consistent with the inside wall surface of second pipe section 12 is identified by the imaginary straight line, labeled with a circled "IL" in FIG. 11. The metal which was previously removed from the inside surface of formed pin section 24 of pin 22 is identified by a circled "RM". The resulting advantages and shape of formed pin section 24 of this embodiment is very similar to that of the formed pin section 24 shown in FIG. 3; however the steps involved in the forming process differ significantly.

As discussed above, FIG. 12 shows the mechanical pipe joint of FIG. 1 or FIG. 11 containing the preferred or alternate embodiment of pin 22, wherein an internal coating 48 is applied to the inside walls of first pipe section 10, second pipe section 12, and certain mechanical joint components and surfaces. When the joint is assembled, as shown in FIG. 12, all exposed surfaces of the pin 22 and socket 14, are protected by the internal coating 48. The function and positioning of sealant 30 remains the same whether or not an internal coating is utilized. The presence of the internal annular bead 32 does however, provide additional protection for the coated surfaces on the contact taper segment 38 of pin 22 and the tapered socket section 18 which come in contact when the mechanical joint is assembled.

Accordingly, the reader will see that the mechanical joint designs and embodiments of this invention clearly advance the availability and scope of pipe joining methodology. The embodiments of this invention improve the reliability and usability of mechanical joints, particularly in environments where conditions are severe and where the extremes of ambient temperatures are encountered. The design of the sealant cavities of this invention recognize the significant technological advancements made in available sealants and bring mechanical joint technology to a level consistent with the availability of advanced sealant products.

While the present invention has been disclosed in various preferred forms, the specific embodiments thereof as disclosed and illustrated herein are considered as illustrative only of the principles of the invention and are not to be considered in a limiting sense in interpreting the claims. The claims are intended to include all novel and non-obvious combinations and sub-combinations of the various elements, features, functions, and/or properties disclosed herein. Variations in size, materials, shape, form, function and manner of operation, assembly and use, are deemed readily apparent and obvious to one skilled in the art from this disclosure, and all equivalent relationships to those illustrated in the drawings and described in the specification are intended to be encompassed in the following claims defining the present invention.

The invention claimed is:

1. A mechanical pipe joint for connecting a first pipe section and a second pipe section, comprising:
   a pin on an end of said first pipe section and a socket on an end of said second pipe section into which said pin is inserted by application of a hydraulic force;
   said socket including a cylindrical socket section having an inside diameter less than an outside diameter of said pin to form an interference fit with said pin when said pin is inserted into said socket and an outwardly extending tapered socket section for connecting said cylindrical socket section to said second pipe section;
   said pin including a cylindrical pin section, a formed pin section on an outside wall surface thereof having a contact taper segment with an angle of taper less than an angle of taper of said outwardly extending tapered socket section of said socket which contacts an inside wall of said outwardly extending tapered socket section of said socket when said pin is inserted in said socket, and a cavity segment;
   an annular cavity defined between said outwardly extending tapered socket section of said socket, a portion of said cylindrical socket section of said socket, and said formed pin section of said pin, in which a sealant is trapped to seal said mechanical pipe joint when said contact taper segment of said formed pin section of said pin is engaged by said application of the hydraulic force into contact with said inside wall of said outwardly extending tapered socket section of said socket; and
   wherein one of:
   (a) said cavity segment of said outside wall surface of said formed pin section of said pin is a tapered surface having an angle of taper less than the angle of said contact taper segment,
   (b) said cavity segment of said outside wall surface of said formed pin section of said pin is a tapering surface with an adjoining triangular annular cavity to facilitate hardening of said sealant trapped in said annular cavity, or
   (c) said cavity segment of said outside wall surface of said formed pin section of said pin is an inwardly recessed surface parallel to said cylindrical pin section of said pin.

2. The mechanical pipe joint according to claim 1, wherein
   said formed pin section of said pin has a contoured contact taper segment and an inside wall surface which is substantially parallel to an inside wall surface of said first pipe section and an inside wall surface of said second pipe section;
   said inside wall surface of said pin and said inside wall surface of said second pipe section are disposed relative to one another such that said formed pin section of said pin is on or above an imaginary straight line extending along said inside wall surface of said second pipe section and through said mechanical pipe joint so as to prevent turbulence in fluids flowing through said mechanical pipe joint.

3. A mechanical pipe joint for connecting a first pipe section and a second pipe section, comprising:
   a pin on an end of said first pipe section and a socket on an end of said second pipe section into which said pin is inserted by application of a hydraulic force;
   said socket including a cylindrical socket section having an inside diameter less than an outside diameter of said pin to form an interference fit with said pin when said pin is inserted into said socket and an outwardly extending tapered socket section for connecting said cylindrical socket section to said second pipe section;
   said pin including a cylindrical pin section, a formed pin section on an outside wall surface thereof having a contact taper segment with an angle of taper equal to an angle of taper of said outwardly extending tapered socket section of said socket which contacts an inside wall of said outwardly extending tapered socket section of said socket when said pin is inserted in said socket, and a cavity segment;
   an annular cavity defined between said outwardly extending tapered socket section of said socket, a portion of said cylindrical socket section of said socket, and said cavity segment of said formed pin section of said pin, in which a sealant is trapped to seal said mechanical pipe joint when said contact taper segment of said formed pin section of said pin is engaged by said application of the hydraulic force into contact with said inside wall of said outwardly extending tapered socket section of said socket; and
   wherein one of:
   (a) said cavity segment of said outside wall surface of said formed pin section of said pin is a tapered surface having an angle of taper less than the angle of said contact taper segment,
   (b) said cavity segment of said outside wall surface of said formed pin section of said pin is a tapering surface with an adjoining triangular annular cavity to facilitate hardening of said sealant trapped in said annular cavity,
   (c) said cavity segment of said outside wall surface of said formed pin section of said pin is an inwardly recessed surface parallel to said cylindrical pin section of said pin, or
   (d) said cavity segment of said outside wall surface of said formed pin section of said pin is a tapered quadrilateral surface configuration having a first side perpendicular to said outside wall surface of said pin, a second side defined by a surface on said formed pin section of said pin recessed from and parallel to said outside wall surface of said pin, a third side defined by a portion of said cylindrical socket section of said socket, and a fourth side defined by a portion of said outwardly extending tapered socket section of said socket, to facilitate hardening of said sealant trapped in said annular cavity of said quadrilateral configuration.

4. The mechanical pipe joint according to claim 3, wherein
   said formed pin section of said pin has an inside wall surface which is substantially parallel to an inside wall surface of said first pipe section and an inside wall surface of said second pipe section;

said inside wall surface of said pin and said inside wall surface of said second pipe section are disposed relative to one another such that said formed pin section of said pin is on or above an imaginary straight line extending along said inside wall surface of said second pipe section and through said mechanical pipe joint so as to prevent turbulence in fluids flowing through said mechanical pipe joint.

5. The mechanical pipe joint according to claim 1, wherein said annular cavity of said quadrilateral configuration is substantially filled with said sealant by the application of said sealant to said formed pin section of said pin prior to insertion of said pin in said socket, which is compressed to a reduced size by said insertion of said pin in said socket beyond the contact point of said contact taper segment of said formed pin section of said pin with said outwardly extending tapered section of said socket to form a compressed annular cavity to facilitate said sealant completely filling said compressed annular cavity.

6. The mechanical pipe joint according to claim 1, wherein said inside wall of said first pipe section, inside wall of said second pipe section, inside wall of said pin of said first pipe section, and a portion of said inside wall of said socket of said second pipe section, are coated with an internal coating to forming a continuous length of joined pipe in which all surfaces exposed to said internal cavity of said first pipe section, said second pipe section, and said mechanical pipe joint are covered with said internal coating.

7. The mechanical pipe joint according to claim 6, wherein said formed pin section of said formed pin section and said inside wall of said pin terminate in a flat surfaced tip end; and said formed pin section and said inside wall of said pin of said first pipe section is coated with said internal coating extending around and covering said tip end, and covering a portion of outside wall of said formed pin section of said pin such that all surface areas of said pin exposed to the internal cavity of said mechanical pipe joint are covered with said internal coating.

8. The mechanical pipe joint according to claim 6, wherein said inside wall of said outwardly extending tapered socket section of said socket of said second pipe section is coated with said internal coating from the end of said inside wall of said outwardly extending tapered socket section connecting with said inside wall of said second pipe section to a location beyond where said contact taper segment of said formed pin section of said pin intersects with said outwardly extending tapered socket section of said socket during insertion of said pin, whereby assuring that all surface areas of said socket exposed to said internal cavity of said mechanical pipe joint are covered with said internal coating.

* * * * *